United States Patent
Hamlin et al.

(10) Patent No.: US 7,645,312 B2
(45) Date of Patent: Jan. 12, 2010

(54) PLEATED MULTI-LAYER FILTER MEDIA AND CARTRIDGE

(75) Inventors: Thomas J. Hamlin, Vernon, CT (US); Gokhan Kuruc, Meriden, CT (US); Peter J. Leavesley, Charlottesville, VA (US); Richard Sale, Tolland, CT (US)

(73) Assignee: 3M Innovative Properties Company, St. Paul, MN (US)

( * ) Notice: Subject to any disclaimer, the term of this patent is extended or adjusted under 35 U.S.C. 154(b) by 86 days.

(21) Appl. No.: 11/250,275

(22) Filed: Oct. 14, 2005

(65) Prior Publication Data

US 2006/0107639 A1 May 25, 2006

Related U.S. Application Data

(60) Provisional application No. 60/619,353, filed on Oct. 15, 2004.

(51) Int. Cl.
*B01D 46/00* (2006.01)
*B01D 59/50* (2006.01)
*B01D 24/00* (2006.01)
*B01D 29/00* (2006.01)
*D04H 1/00* (2006.01)

(52) U.S. Cl. .......................... 55/498; 55/486; 210/490; 210/457; 442/327

(58) Field of Classification Search ................ 210/490, 210/457; 55/486, 498; 442/327
See application file for complete search history.

(56) References Cited

U.S. PATENT DOCUMENTS

| | | | |
|---|---|---|---|
| 3,505,794 A | 4/1970 | Nutter et al. | |
| 4,089,783 A | 5/1978 | Holyoak et al. | |
| 4,130,487 A | 12/1978 | Hunter et al. | |
| 4,305,782 A | 12/1981 | Ostreicher et al. | |
| 4,473,474 A | 9/1984 | Ostreicher et al. | |
| 4,676,904 A | 6/1987 | Schroeder et al. | |
| 4,878,929 A * | 11/1989 | Tofsland et al. | ............... 55/486 |
| 5,085,784 A | 2/1992 | Ostreicher | |
| 5,232,595 A | 8/1993 | Meyer | |
| 5,882,288 A | 3/1999 | Paul et al. | |
| 6,113,784 A | 9/2000 | Stoyell et al. | |
| 6,315,130 B1 | 11/2001 | Olsen | |
| 6,598,749 B2 | 7/2003 | Paul et al. | |

(Continued)

FOREIGN PATENT DOCUMENTS

GB       1265089 A       3/1972

(Continued)

OTHER PUBLICATIONS

Sartorius AG, "Jumbo Filters, Powerful Performance," product brochure, 2001, Sartorius AG, Germany.

*Primary Examiner*—Walter D Griffin
*Assistant Examiner*—Amber Orlando
(74) *Attorney, Agent, or Firm*—Aleksander Medved

(57) ABSTRACT

A pleated filter element includes a composite depth filter medium formed into a plurality of pleats. The composite depth filter medium includes a plurality of depth filter media layers. Each of the plurality of depth filter media layers includes adsorber particulate matter. Each of the plurality of depth filter media layers may have a thickness less than about 1300 microns. The plurality of depth filter media layers may have at least 50% by weight of adsorber particulate matter.

34 Claims, 8 Drawing Sheets

U.S. PATENT DOCUMENTS 6,627,088 B1 * 9/2003 Breitenbach et al. ........ 210/753
6,712,966 B1    3/2004 Pulek et al.
7,081,201 B2 * 7/2006 Bassett et al. ............... 210/315
2003/0207635 A1 11/2003 Minemura et al.
2004/0060858 A1 * 4/2004 Lucas et al. ................. 210/338

FOREIGN PATENT DOCUMENTS

WO    WO 01/21279 A    3/2001

* cited by examiner

| Comparison between first example embodiment and Millipore Millistack HC | | | | | | | | | |
|---|---|---|---|---|---|---|---|---|---|
| | Cartridge Dimensions | | | Comparative Properties Based on Effective Media | | | | | |
| | ID | OD | h | $A_s$ | $M_a$ | MPD | MUI | $G_k$ | DCI |
| Millistack HC | 2 | 16 | 7 | 19.63 | 9.16 | 11.25 | 220.77 | 4.78 | 0.34 |
| First Example Embodiment | 2 | 16 | 7 | 33.21 | 10.48 | 12.87 | 427.25 | 6.28 | 0.54 |

FIG. 11

| Comparison between second example embodiment and Pall-Seitz SUPRA disk | | | | | | | | | |
|---|---|---|---|---|---|---|---|---|---|
| | Cartridge Dimensions | | | Comparative Properties Based on Effective Media | | | | | |
| | ID | OD | h | $A_s$ | $M_a$ | MPD | MUI | $G_k$ | DCI |
| Pall-Seitz SUPRAdisk | 2.5 | 11.2 | 11 | 19.4 | 5.31 | 8.47 | 164.26 | 1.98 | 0.16 |
| First Example Embodiment | 2.5 | 11.2 | 11 | 23.91 | 7.54 | 12.03 | 287.5 | 4.19 | 0.49 |

FIG. 12

| Comparison between third example embodiment and U.S. Patent No. 5,232,595 | | | | | | | | | |
|---|---|---|---|---|---|---|---|---|---|
| Cartridge dimensions | | | | Comparative properties based on Effective Media | | | | | |
| Number of rings | ID | OD | h | $A_s$ | $M_a$ | MPD | MUI | $G_k$ | DCI |
| 1 | 2 | 9 | 15 | 13.9 | 3.01 | 5.45 | 75.72 | 0.76 | 0.11 |
| 2 | 2 | 9 | 15 | 18.1 | 5.34 | 9.67 | 174.24 | 1.74 | 0.24 |
| 3 | 2 | 9 | 15 | 13.98 | 5.92 | 10.72 | 149.85 | 1.5 | 0.21 |
| 4 | 2 | 9 | 15 | 10.94 | 6.12 | 11.09 | 121.28 | 1.21 | 0.17 |
| 5 | 2 | 9 | 15 | 8.83 | 6.07 | 11 | 97.12 | 0.97 | 0.14 |
| Third Example Embodiment | ID | OD | H | $A_s$ | $M_s$ | MPD | MUI | $G_k$ | DCI |
| NA | 2 | 9 | 15 | 20.52 | 6.47 | 11.72 | 240.45 | 3.51 | 0.49 |

FIG. 13

Throughput Study of Flatstock and Pleated Cartridge Format of Thin Adsorptive Media

| Configuration Tested | Total Throughput L/m$^2$ at 25 PSID |
|---|---|
| 3 Layer 47mm from Flat Stock Sample 1 | 888 |
| 3 Layer 47mm from Flat Stock Sample 2 | 925 |
| 3 Layer 47mm from Pleated Media Sample 1 | 937 |
| 3 Layer Pleated 10 inch Cartridge Sample 1 | 915 |
| 3 Layer Pleated 10 inch Cartridge Sample 2 | 972 |

FIG. 14

PLEATED MULTI-LAYER FILTER MEDIA AND CARTRIDGE

RELATED APPLICATIONS

This application is a continuation-in-part of U.S. Provisional Application No. 60/619,353 of Hamlin et al., filed on Oct. 15, 2004, the disclosure of which is herein incorporated by reference to the extent not inconsistent with the present disclosure.

BACKGROUND OF THE DISCLOSURE

The present disclosure relates in general to pleated filter media and, in particular, to pleated adsorptive depth filter media for filtering fluids and to the filter cartridges utilizing such pleated filter media.

Filtration is the process of separating particles or contaminants from a fluid (liquid or gas), and can be accomplished by passing the fluid through porous filter media that stops or captures the particles while permitting the fluid to pass therethrough. Most conventional filter media may be categorized into two broad categories: surface-type filter media, which stops fluid contaminants on its surface, and depth-type filter media, which captures contaminants within the medium, i.e. between an upstream surface and a downstream surface of the medium.

Depth-type filter media and, in particular, adsorptive depth filter media, have long been known. Adsorptive depth-type filter media use a variety of materials for filtering fluids, including cellulose and any of a variety of adsorber particulate matter. Other materials, such as glass fibers or synthetic fibers (for example, polypropylene fibers or polyethylene fibers), may be included. Known adsorptive depth-type filter media typically include between 30% to 50% cellulose, although the cellulose may comprise as little as 10% by weight of the total. Known depth filter media also typically include between 50% to 70% by weight of particulate adsorber matter. Filter performance is enhanced by maximizing the amount of fine adsorber particulate matter in the depth filter media layers. Known adsorber particulates that are suitable for the intended purpose, include diatomaceous earth (i.e. an earth having friable dust like silica of diatomaceous origin), perlite, talc, silica gel, activated carbon, asbestos, molecular sieves, clay, etc. For the most part, these adsorber particles have diameters of less than 10 microns. Siliceous materials, such as diatomaceous earth or perlite, are commonly used. Furthermore, it is known that adsorptive particulate materials may be impregnated with other chemicals for providing or enhancing selective adsorption characteristics. Additionally, depth filter media may include binder resins.

Commonly, such adsorptive depth filter media have been used in lenticular-type stacked disc filter elements (as illustrated in U.S. Pat. No. 6,712,966, the disclosure of which is incorporated herein by reference to the extent not inconsistent with the present disclosure). Adsorptive depth filter media require a reasonable flow-through thickness in order to provide the contaminants sufficient contact opportunity to be adsorbed by the filter medium and to effectively remove contaminants from a fluid stream. Typical thicknesses for depth-type media have ranged from 2500 to 7500 microns thick. For a given filter volume displacement of a lenticular-type filter unit composed of a plurality of lenticular cells, the maximum surface area and media packing density are limited due to the thickness of support separators found inside the cells and the space between cells necessary to permit acceptable flow rate.

Pleating is recognized as one approach to achieving a high media packing density in a given filter volume. Pleated filters are typically made with relatively thin cellulosic or synthetic surface-type filter media folded in an accordion-like fashion. In a cylindrical radial-pleated type filter element there may be a significant degree of spacing between outer tips of the pleats. Spiral pleat filters (see U.S. Pat. No. 6,598,749, the disclosure of which is incorporated herein by reference to the extent not inconsistent with the present disclosure) and multiple rings of concentrically located pleated filter elements (see U.S. Pat. No. 5,232,595, the disclosure of which is incorporated herein by reference to the extent not inconsistent with the present disclosure) have been used to reduce this outer tip spacing and increase the filtering surface area. U.S. Pat. No. 6,315,130 to Olsen, which issued Nov. 13, 2001, and which is hereby incorporated by reference to the extent not inconsistent with the present disclosure, teaches using pleats of varying height to increase the pleat density at the outer diameter of the cylindrical filter and to increase the filtering surface area. It is also known to use different layers of filter media in a filter cartridge in order to increase the depth of the media and to impart different filtration characteristics at each layer.

Pleating requires tight bending radii, i.e. that the filter media bend sharply to form the pleats. For this reason, pleated filters have typically been formed with relatively thin, flexible cellulosic or synthetic surface-type filter media, rather than with the thicker adsorptive depth filter media. Surface-type filter media, which include meltblown, needle-felted, or spunbonded polymeric media, wet laid or air laid glass fiber media, cellulosic fiber media which may be resin impregnated, micro-porous polymeric membrane, metal fiber or perforated metal media, and any combinations above, have been used for pleating. These surface-type filter media lack the highly desirable particulate adsorbers found in adsorptive depth filter media.

However, adsorptive depth-type filter media, which incorporate such particulate matter, are brittle and typically cannot withstand the elongation at the bend radii when pleated. For example, when an attempt was made to pleat a cellulosic filter media having a high amount of particulate adsorber material (about 60% or greater of diatomaceous earth) and having a thickness of about 3.56 mm, the filter media cracked. The cracking is a result of the filter media's structure and its rigidity caused by the high amounts of diatomaceous earth (DE). Due to the structure of the fibers in the filter media, the entire thickness of the media will bend in unison. Because the external bend radius for such a thick layer is significantly greater than the neutral bending radius, there is a high degree of tensile strain along the external bend radius. Also, because the internal bend radius is significantly smaller than the neutral bending radius, there is a high degree of compressive strain along the internal bend radius. Cracking and splitting of the fibers in the filter media is the inevitable result of these high strains because the filter media contains high amounts of particulate adsorbers and low amounts of cellulose. The thicker the filter media, the greater the difference is between external and internal bending radius, leading to high filter media elongation at the external radius and high filter media compression at the internal radius. Thus, pleating conventional adsorptive depth filter media causes the filter media to crack or tear, thereby losing both filtering ability and structural integrity. Lenticular-type stacked disc filter elements avoided this problem by not bending the depth-type filter media.

U.S. Pat. No. 5,232,595 to Meyer, the disclosure of which is incorporated herein by reference to the extent not inconsistent with the present disclosure, discloses pleated adsorptive depth-type filter media. Specifically, Meyer discloses a deep bed pleated filter with an individual filter media layer thickness of at least 1 mm. Meyer further discloses that adsorptive depth-type filter media can be pleated provided that the particulate adsorber content is 50% or less by dry weight.

There is a need for high media packing density in an adsorptive depth-type filter module. High packing density in an adsorptive depth-type filter media provides improved filtration efficiency. There is also a need for increased surface area for a given media mass in an adsorptive depth-type filter module. Increased surface area for a given media mass provides higher flow rate. Thus, both high media packing density and increased surface area are important in an adsorptive depth-type filter. Typically, however, there is a trade-off between achieving these desirable filter characteristics. Thus, there is a need for an adsorptive depth-type filter module that has high media packing density without sacrificing surface area. Further, there is a need for an adsorptive depth-type filter module that allows the fluid to be filtered to substantially access the entire filter media. The present state of the art does not allow the use of adsorptive depth filter media in high media density pleat designs, such as disclosed in Olsen, and as a result high media packing density has not been achieved in adsorptive depth-type filter modules. The present art also has problems associated with wet weight. After the lenticular cartridges are used the added weight due to the media being wet makes it cumbersome to handle. In addition the lenticular style cartridges also have many parts which contribute to the total weight of the cartridge. Another problem with the lenticular style cartridges becomes the size, when larger quantities of fluid need to be filtered, larger diameter lenticular cartridges are used, these lenticular cartridges both use more floor space and also makes it more difficult to handle due to cartridge size.

SUMMARY OF THE DISCLOSURE

An embodiment of the present disclosure includes pleated filter elements having a composite depth filter medium formed into a plurality of pleats, the composite depth filter medium being formed while sufficiently dry. The composite depth filter medium includes a plurality of depth filter media layers, each of the plurality of depth filter media layers including adsorber particulate matter. Each of the plurality of depth filter media layers has a thickness less than about 1300 microns.

In one aspect of the present disclosure, the thickness of each of the plurality of depth filter media layers may have a thickness less than about 950 microns.

In another aspect, the plurality of depth filter media layers may range from 3 layers to 20 layers.

In a further aspect of the present disclosure, at least one of the plurality of depth filter media layers may include at least 50% by weight of adsorber particulate matter. At least one of the plurality of depth filter media layers may include at least 60% by weight of adsorber particulate matter. Further, at least one of the plurality of depth filter media layers may include at least 70% by weight of adsorber particulate matter.

In another aspect of the present disclosure, each of the plurality of depth filter media layers may include cellulose and the adsorber particulate matter may comprise one of diatomaceous earth, perlite, talc, activated carbon, asbestos and a combination thereof.

In even another aspect, the composite depth filter medium further may include at least one of an upstream medium support layer, a downstream medium support layer and a microporous layer.

In yet another aspect of the present disclosure, the plurality of pleats may include a plurality of approximately radially extending pleats to form a cylindrically pleated filter element. The radially extending pleats may include outwardly radiating primary pleats and inwardly radiating secondary pleats, the secondary pleats being interspersed among the primary pleats, each primary pleat having a radial height, and each secondary pleat having a radial height that is less than the radial height of each primary pleat. A primary pleat is a pleat that extends from the central core of the filter cartridge to do outer periphery of the filter cartridge. The plurality of pleats may be configured such that one secondary pleat is positioned between two adjacent pairs of primary pleats. The plurality of pleats may be configured such that two secondary pleats are positioned between two adjacent pairs of primary pleats. The plurality of pleats may also be configured such that one secondary pleat is positioned between two adjacent primary pleats.

In one aspect, the cylindrically pleated filter element may be adapted to accommodate, in a first operational mode, a fluid flow in a first radial direction and, in a second operational mode, a fluid flow in a second radial direction, opposite to the first radial direction.

In yet a further aspect, the plurality of radially extending pleats may be curved to form a cylindrically pleated filter element having a spiral arrangement. The cylindrically pleated filter element may have an inner periphery and an outer periphery. The plurality of pleats may have root portions adjacent the inner periphery and crest portions adjacent the outer periphery, and at least one of the root portions and the crest portions of adjacent pleats may be radially spaced from one another at a uniform frequency.

Another embodiment of the present disclosure includes a pleated filter element having a composite depth filter formed into a plurality of pleats. The composite depth filter may include a plurality of depth filter media layers, each of the plurality of depth filter media layers may include adsorber particulate matter. At least one of the plurality of depth filter media layers may include at least 50% by weight of adsorber particulate matter. Each of the plurality of depth filter media layers may have a thickness less than about 1300 microns.

A further embodiment of the present disclosure filter module includes a pleated filter element having a composite depth filter medium formed into a plurality of pleats. The plurality of pleats includes a plurality of radially extending pleats forming a cylindrical pleated filter element. The cylindrical pleated filter element has an inner periphery and an outer periphery. The composite depth filter medium includes a plurality of depth filter media layers, each of the plurality of depth filter media layers including adsorber particulate matter, and each of the plurality of depth filter media layers having a thickness less than about 1300 microns. A cylindrical core is coaxially positioned within the inner periphery of the cylindrical filter element. A cylindrical outer cage is coaxially positioned about the outer periphery of the cylindrical filter element.

Another embodiment of the present disclosure includes a method of making a pleated filter element. The method includes providing a first depth filter media layer having a thickness less than about 1300 microns and providing a second depth filter media layer having a thickness less than about 1300 microns. The method further includes stacking the second depth filter media layer on the first depth filter media layer and pleating the stacked first and second depth filter media layers. The method may also include providing a third and a fourth depth filter media layer, each layer having a thickness less than about 1300 microns. At least one of the first and second depth filter media layers may have a thickness less than about 900 microns. At least one of the depth filter media layers may include at least 50% by weight of adsorber particulate matter. Further, the pleating step may include providing a plurality of primary pleats having a radial height and a plurality of secondary pleats having a radial height less than the radial height of each primary pleat. The method may also include providing at least one medium support layer.

Yet another embodiment of the present disclosure includes method of making a pleated filter element that includes providing a first depth filter media layer having at least 50% by weight of adsorber particulate matter and providing a second depth filter media layer having at least 50% by weight of adsorber particulate matter. The method includes stacking the second depth filter media layer on the first depth filter media layer and pleating the stacked first and second depth filter media layers. At least one of the first and second depth filter media layers may have a thickness less than about 1300 microns. Further, the method may include providing a third and a fourth depth filter media layer, each layer having at least 50% by weight of adsorber particulate matter. At least one of the depth filter media layers may include at least 60% by weight of adsorber particulate matter.

Other objects and advantages of the disclosure will be apparent from the following description, the accompanying drawings and the appended claims.

BRIEF DESCRIPTION OF THE DRAWINGS

FIG. 11 depicts Table I, which is a comparison of a first example embodiment to the prior art of FIG. 8;

FIG. 12 depicts Table II, which is a comparison a second example embodiment to the prior art of FIG. 9;

FIG. 13 depicts Table III, which is a comparison of a third example embodiment to the prior art of FIG. 10; and FIG. 14 depicts Table IX, which is a comparison of a third example embodiment to the prior art of FIG. 10.

DETAILED DESCRIPTION OF THE DISCLOSURE

Figure 1:
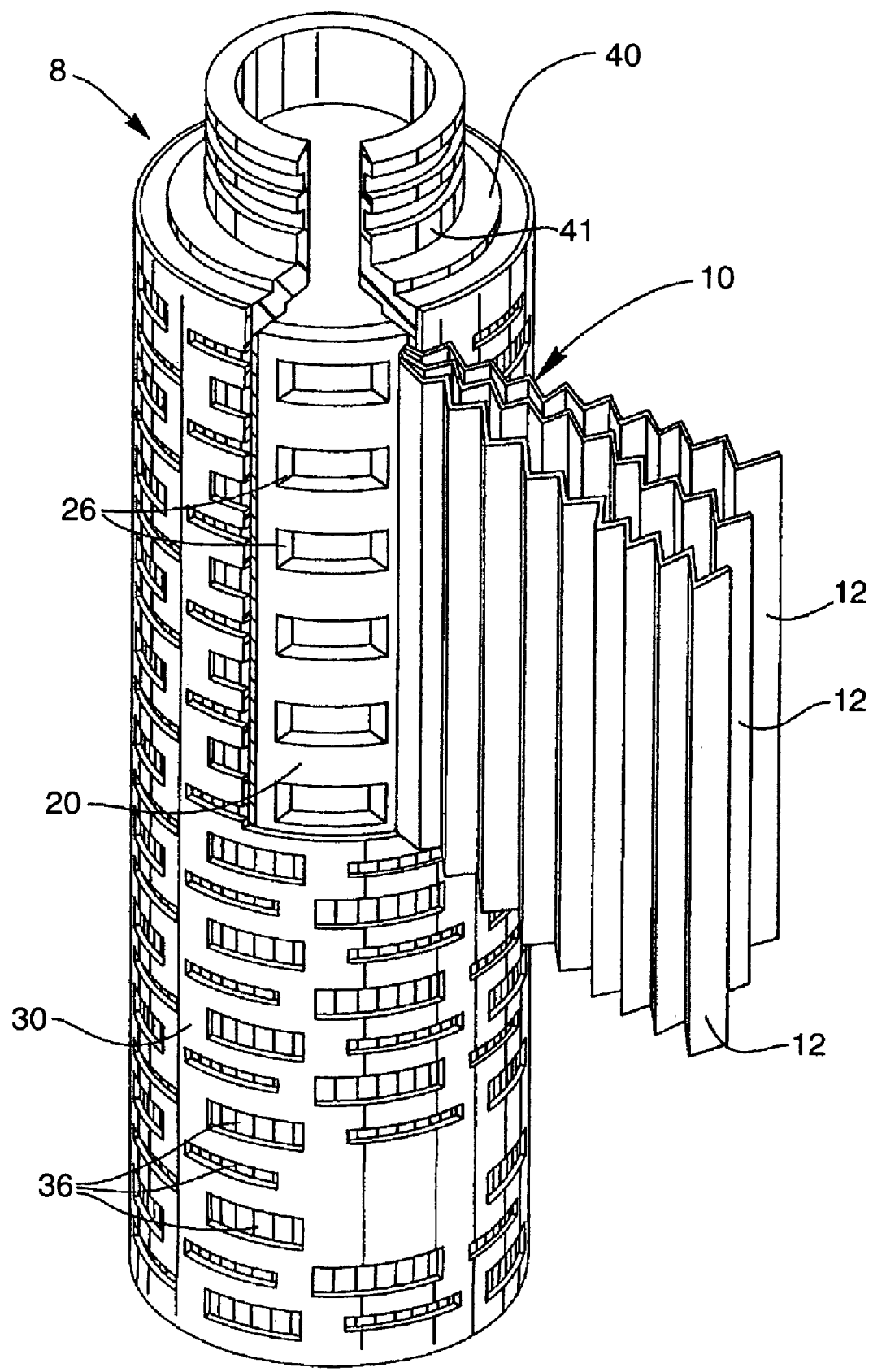
FIG. 1 is a perspective view, partially cut away, of a filter cartridge including a filter module according to one embodiment of the present disclosure.

Referring now to the drawings wherein like reference numerals identify similar structural elements and/or features of the subject disclosure, there is illustrated in FIG. 1 a pleated filter module designated generally by reference numeral 8.

Figure 2:
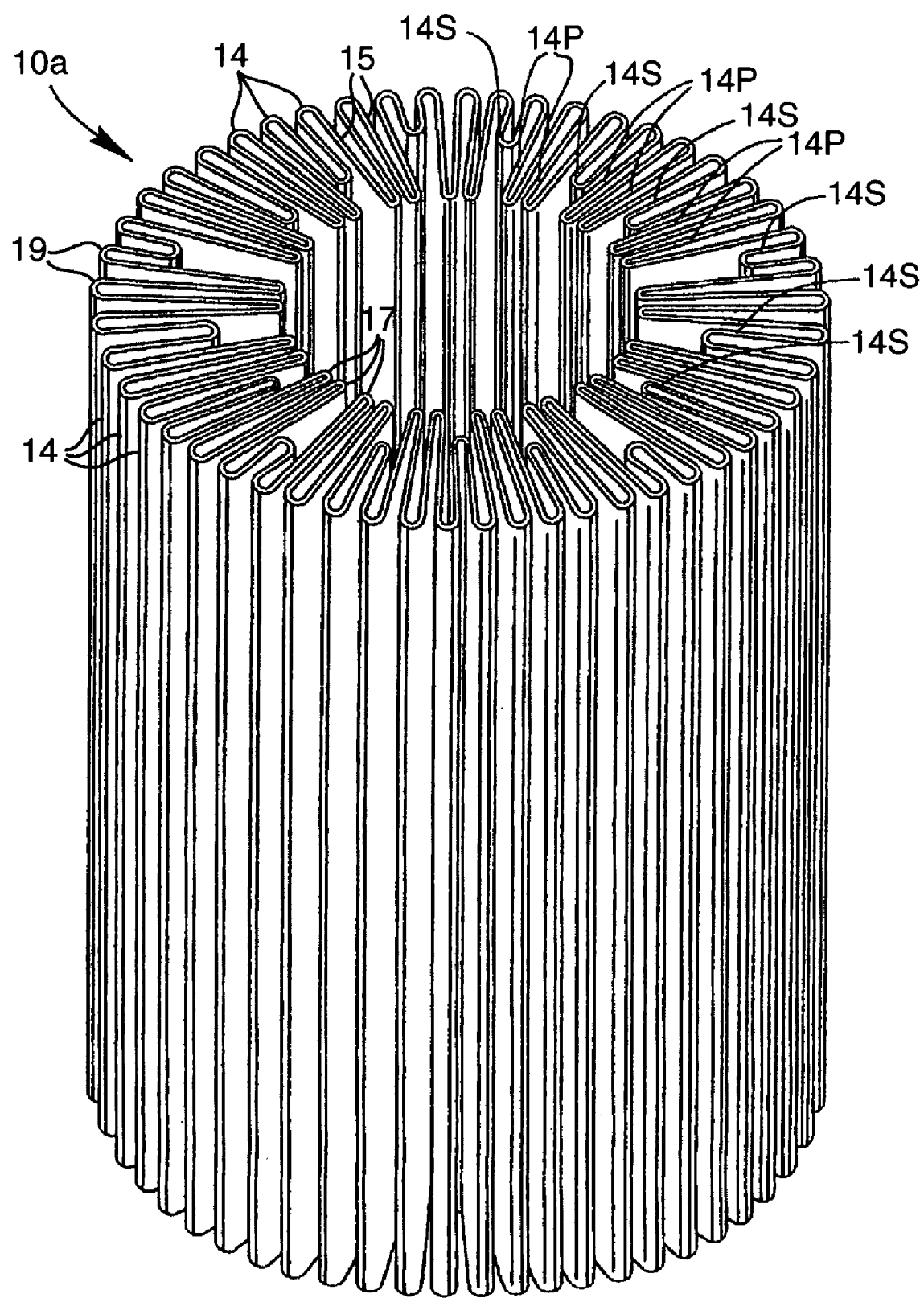
FIG. 2 is a perspective view of a filter element according to the embodiment of FIG. 1.

A typical filter module includes single or multiple layers of a filter media of the same or different porosity, with or without additional support layers and/or micro-porous membrane layers. In addition, a typical filter module also includes end sealing means or end caps 40, support and drainage means, an inner core supporting means, and an optional outer periphery support means. Referring now to FIGS. 1 and 2, filter module 8 includes an elongated pleated composite filter element 10 having a plurality of longitudinal pleats 14 surrounding a central perforated cage 20 and enclosed within a perforated outer cage 30. Core 20 supports the inner periphery of filter element 10 against forces in the radial direction and also helps to give filter module 8 axial strength and rigidity against bending. Outer cage 30 retains the pleats of the filter element 10 in a cylindrical pleated configuration and, similarly to core 20, outer cage 30 supports the outer periphery of filter element 10 against forces in the radial direction and also helps to give filter module 8 axial strength and rigidity against bending. It is envisioned that means other than outer cage 30 may be provided to retain the pleats. For example, a polymeric netting or mesh material may be utilized to retain the pleats about the outer periphery of the filter module. Housing adapters are operatively associated with the upper and lower ends caps of the filter module and can be open (as shown) or closed depending upon the filtration application in which filter module 8 is employed.

Figure 3:
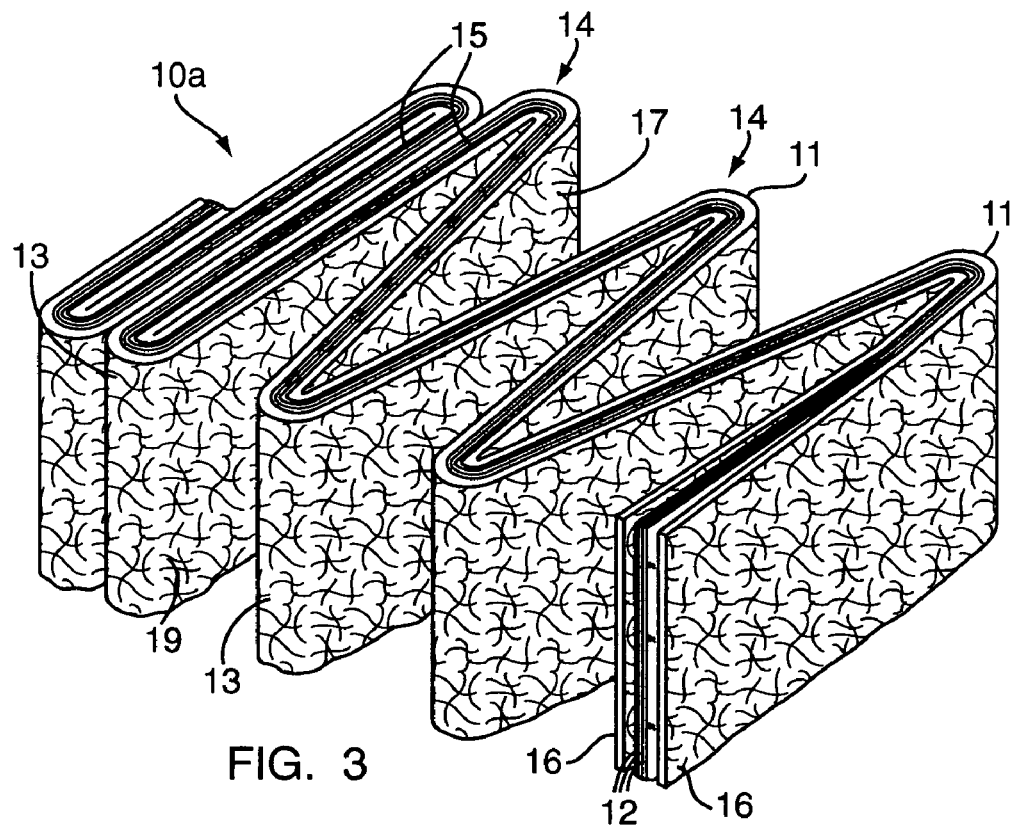
FIG. 3 is a perspective view of a portion of a filter element according to the embodiment of FIG. 1.

As best shown in FIG. 3, filter element 10 is a multi-layer pleatable media that includes a plurality of adsorptive depth-type filter media layers 12. Pleatable media includes filter media that is produced within a certain range of thickness, such that it can be pleated without compromising the structural integrity of the filter media. In the context of the present disclosure, adsorptive depth-type filter media (also referred to as depth filter media) is considered to be any filter matrix that relies in part on adsorption and absorption to capture contaminants from a fluid stream. Depth filter media may also perform pore size exclusion filtration. Depth filter media typically includes at least one particulate adsorber constituent. In the context of the present disclosure, particulate adsorber material is considered to be a non-fibrous constituent of a filter matrix, which is generally comprised of a minute separate particles, as of a granular substance, functionalized beads or powder and which has the capacity to accumulate contaminants on its surface or in the internal pore structure where it exists. In addition, a particulate adsorber may further exhibit absorptive properties. Typical particulate adsorber material may have a mean particle size in the range of about 1 to about 200 microns. The amount of particulate adsorber constituent in depth filter media may range from about 20 to about 80 percent by weight.

In the present disclosure, the thickness of each individual depth filter media layer ranges from about 250 microns to less than about 1300 microns. A typical thickness for each layer 12 would be about 750 microns.

Each adsorptive depth-type filter media layers 12 may include, without limitation, cellulose and adsorber particulate matter. Other materials, such as glass fibers and binder resins, may be included. Depth filter media layers 12 include high amounts of adsorber particulate matter. In one aspect, layers 12 include at least about 50% by weight of adsorber particulate matter. In another aspect, layers 12 include from about 55% to about 85% by weight of adsorber particulate matter. A range of about 60% to about 80% by weight of particulate matter is preferred. Any known adsorber particulate matter that is suitable for the intended purpose may be used, with diatomaceous earth (DE) or perlite being preferred. Depth filter media layers 12 may include charge modified material, i.e. any material that has been treated with a cationic or anionic agent to impart a specific surface charge that is different from the inherent characteristic of the surface prior to treatment or has been chemically modified to target specific moieties.

Typically, depth filter media are produced by a wet laid papermaking operation using an aqueous slurry of cellulose fiber and particulate adsorber matter. Particulate adsorbers may contain chemical moieties that allow specific capture of particulates based on charge (ionic interactions) i.e., cation or anion exchange media, hydrophobic interactions (attraction among less soluble particulates), and/or specific chemical affinity as with antibodies and antigens or ligands and receptors. These particulate adsorbers can be made of a variety of materials known to those skilled in the art where the adsorptive and/or absorptive functionality is substantially irreversibly bound to the particulate adsorber which have a size of about 1 to about 200 microns. It is anticipated that irregularly shaped particulate adsorbers may function more effectively, but that is not a requirement to this disclosure. The cellulose fiber may be composed of refined or unrefined pulp. Unrefined pulp is commercially available pulp that has not been subjected to secondary refining operations by the end user; refined pulp is commercially available pulp that has been subjected to secondary refining by the end user to alter the pulp properties. A viscosity modifier, resin or latex may be added to the slurry. Alternatively, depth filter media may include polymeric sheet media having one or more of the following constituents: polymeric binding particles, activated carbon particles, diatomaceous earth, ion-exchange resin, and polymeric fibers.

Filter element 10 includes at least two layers 12. Without limiting the disclosure, it is expected that the total thickness of filter element 10 may likely range from about 2500 microns to about 7500 microns. Thus, if each individual layer 12 is from about 250 microns to about 500 microns thick, the number of layers for a filter element having a thickness of about 2500 microns would range from about 5 to about 10. The number of layers for a filter element having a thickness of about 5000 microns would range from about 10 to about 20, again assuming an individual layer thickness of about 250 to about 500 microns.

Filter element 10 may include additional layers. For example, as shown in FIG. 3, one or more outer layers 16 of support media, such as spunbond polypropylene or woven or non-woven polyester, may be placed on either side of depth filter media layers 12. Such support media may provide support in a reverse flow/pressure condition and may insure that fluid flow is not obstructed between two adjacent pleats if they are in contact. The upstream and downstream support media layers 16 can be of the same or different construction. Outer layers 16 do not act as filter media.

Figure 5:
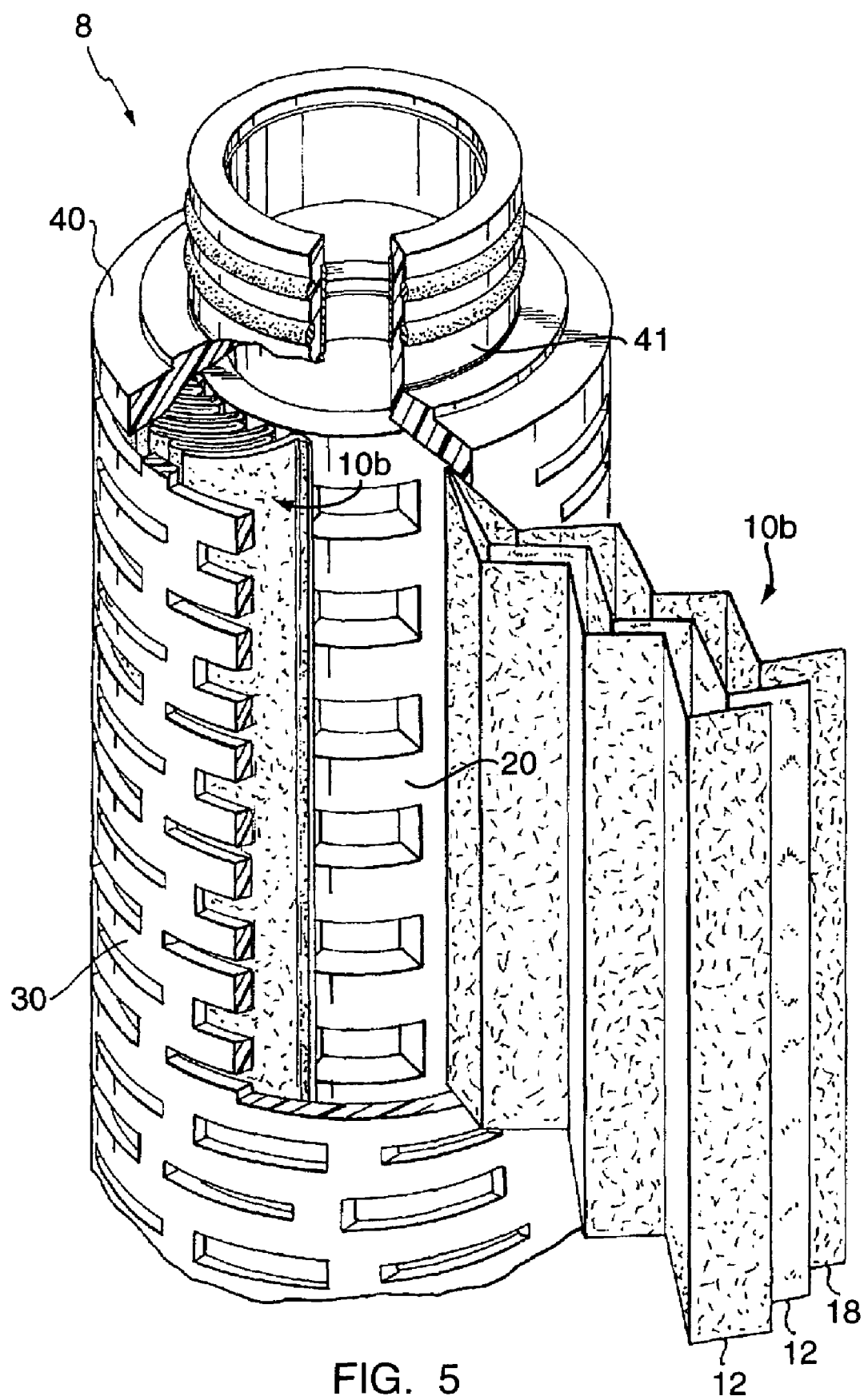
FIG. 5 is a perspective view, partially cut away, of a filter cartridge including a filter module according to another embodiment of the present disclosure.

Other layers (not shown) in filter element 10 may include a thin layer of melt-blown material used to reduce particulate adsorber migration from the depth filter media layers. This melt-blown material layer does not increase particle retention over the depth filter media layers 12. Further, as schematically shown in FIG. 5, a microporous membrane 18, having a pore size of about 0.1, 0.2, 0.45, 0.65 or 0.8 microns typically may be placed downstream of the depth filter media layers. In this situation, the depth filter media layers would act as a pre-filter to the microporous membrane filter, thereby reducing the conventional two step filtering process to a single step.

Furthermore, filter element 10 may include depth filter media layers 12 having different filtering characteristics (e.g., one layer acting as a pre-filter for the second layer). Varying the filtering characteristics of the plurality of filter media layers 12 may provide improved filtration. When an arrangement of depth filter media layers having decreasing porosity in the direction of flow is combined with the advanced pleat configurations described below, several major benefits may be realized, in accordance with the values for various factors and indices that are defined below. The media packing density (MPD) within a given volumetric footprint may be about 10% to about 20% greater, the media utilization index (MUI) may be about 74% to about 90% greater, the $G_k$ factor may be about 30% to about 110% greater, and the dimensionless comparison index (DCI) may be about 50% to about 200% greater than the previously lenticular cartridge designs. The surface area of the filter media within a given volumetric foot print may be increased up to about 35% to about 75% greater than the same lenticular cartridge design. Another anticipated benefit is that increased surface area of the filter media reduces the flux (flow per unit area) which in turn can increase the adsorption capability. The increased mass of the media also increases the adsorption capability, or in other words, by keeping the flux the same, the increased surface area allows a higher flow rate to be used.

Several layers of these thin (about 1300 microns or less) depth filter media layers 12 can be stacked to obtain a total adsorptive depth media thickness about equal to the conventional thickness (about 2500 to about 7500 microns). The resulting multi-layered filter element 10 can be pleated on any regular pleating machine (for instance, a Rabofsky E2000) commonly used within the industry.

High area pleat designs, i.e. those designs that increase the packing density of filter media within a cylindrical filter module as compared to conventional pleat designs, are described below. Referring now to FIG. 2, filter element 10a is shown as having a high-area pleat design, in this instance, a modified W-pleat construction. The modified W-pleat design of filter element 10a has been found to provide filter area gains typical of a spiral-pleat filter, with an increase in the number of available radial flow paths of the filter at outer cage 30. In addition, filter element 10a has been found to provide a greater overall filter density between core 20 and outer cage 30, with the greater overall filter density improving inter-pleat support to reduce the likelihood of pleat migration and binding.

Figure 4:
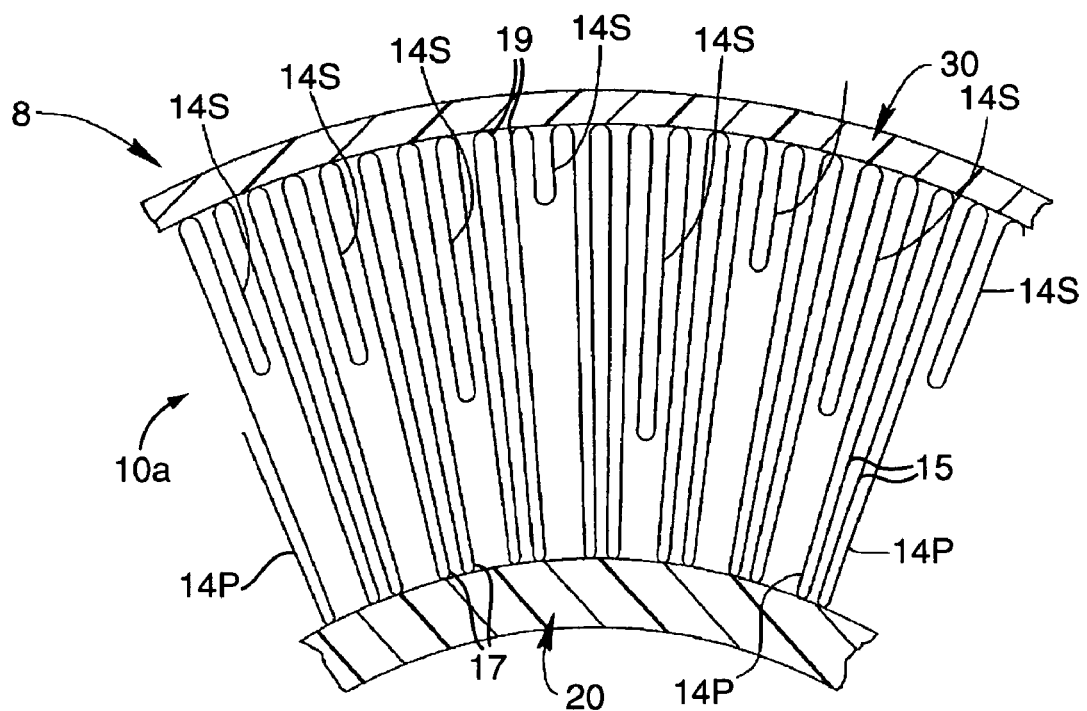
FIG. 4 is a sectional view of a portion of the filter module according to the embodiment of FIG. 1.

Referring to FIGS. 2 and 4, cylindrical filter element 10a includes a plurality of longitudinally and radially extending pleats 14, each of which has a pair of pleat legs 15 joined to one another. Pleats 14 include outwardly radiating primary pleats 14P and inwardly radiating secondary pleats 14S, with at least one secondary pleat positioned between two adjacent primary pleats. Details of the modified W-pleat design can be found in U.S. Pat. No. 6,315,130 to Olsen. It should be noted that in FIGS. 2 and 4, pleats 14 are shown spaced apart more than they actually are for purposes of illustration. In an actual filter element, the pleats would be positioned closer together so that adjacent pleats would touch each other near central core 20, whereby a greater amount of filter media is fit between core 20 and outer cage 30.

When filter element 10a is being used such that fluid flows radially inwardly though filter element 10a, i.e. from outer cage 30 to core 20, the surfaces of the pleat legs facing core 20 (internal surfaces) form the downstream surface 17 of filter element 10a, while the surfaces of the pleat legs facing outer cage 30 (external surfaces) form the upstream surface 19 of filter element 10a. Conversely, when filter element 10a is being used such that fluid flows radially outwardly through filter element 10a, i.e. from the core to the outer cage, the internal surfaces of the pleat legs define the upstream surface of filter element 10a and the external surfaces of the pleat legs define the downstream surface of filter element 10a. In either configuration of filter element 10a, adjacent pleat surfaces of adjoining pleat legs are in substantially mutually supporting contact with one another over their respective heights.

Variations in the arrangement of secondary pleats 14S with respect to primary pleats 14P are possible. For example, filter element 10a could include two secondary pleats 14S of varying heights between adjacent pairs of primary pleats 14P, or filter element 10a could include one secondary pleat 14S between every two adjacent primary pleats 14P. In addition, although not shown, filter element 10a could have varying numbers of secondary pleats 14S between adjacent primary pleats 14P.

Modified W-pleat filter elements have been found to have a far greater surface area usable for filtration than conventional radial pleated filter elements having the same inner and outer diameters. In general, it has been found that modified W-pleat filter element 10a could have about thirty percent (30%) more surface area than a conventional straight radial pleated filter element. In comparison, a conventional W-pleated filter element has only about twenty percent (20%) more surface area than a conventional straight radial pleated filter element.

In addition, modified W-pleat filter element 10a also provides a greater and more consistent filter density between core 20 and outer cage 30 of filter module 8 as compared to either a conventional W-pleated filter (having a uniform repeating pattern of one half pleat between two pairs of fill pleats) or a conventional straight radial pleated filter.

The greater and more consistent filter density of modified W-pleat filter element 10a results in improved inter-pleat support and a more even distribution of loads applied to the filter element. The greater and more consistent filter density, therefore, minimizes pleat migration and binding, and increases the ability of the pleats to retain particles in a pulsating flow system. Furthermore, modified W-pleat filter elements have been found to provide a greater filter life than conventional straight pleated filter elements. Even further, modified W-pleat filter elements have been found to have advantages over spiral-pleat filter elements. In particular, a modified W-pleat filter element typically provides filter area and filter density gains similar to a spiral pleated filter element, with an increase in the number of radial flow paths of the filter available at outer cage 30 of filter module 8. In addition, a modified W-pleat filter element is typically more easily inserted into an outer cage than a spiral-pleat filter element, whose pleats must be rolled over, or "spiraled" before being inserted into the cage.

The modified W-pleat design may also increase the filter element's ability to withstand reverse flow conditions. A standard pleated filter element, having relatively low structural integrity, can withstand only a very low pressure drop across the pleats before collapsing when the fluid flows from core 20 to outer cage 30. With the modified W-pleat design, the structural integrity of the filter element is increased because the point of tightest packing of the pleats is moved towards the outer periphery of the filter element, thereby providing more inter-pleat support as compared to a filter element having standard pleats. It is expected that the point of tightest packing would be located at the height of the shortest pleat.

Although, a modified W-pleat design for filter element 10 is disclosed above, other pleat designs are within the scope of the present disclosure. For example, in an alternative embodiment, as shown in FIG. 5, filter module 8 may include a spiral-pleat filter element 10b. An example of a spiral-pleat filter element 10b having a suitable pleat geometry for incorporation into the present disclosure is disclosed in U.S. Pat. No. 6,598,749 to Paul et al., the disclosure of which is herein incorporated by reference to the extent not inconsistent with the present disclosure. As disclosed in Paul et al., the heights of the individual spiral pleats need not be uniform throughout filter element 10b. As a result, the flow characteristics of filter module 8 are improved relative to conventional spiral-pleat filter modules wherein all of the pleats are equal in height and tightly packed within the module. In addition, non-uniform pleat heights allow filter element 10b to be axially inserted into a supporting cage with relative ease, and without frictionally dragging the pleat crests against the interior surface of outer cage 30. Consequently, the filter media will not be damaged during filter module assembly.

Figure 6A:
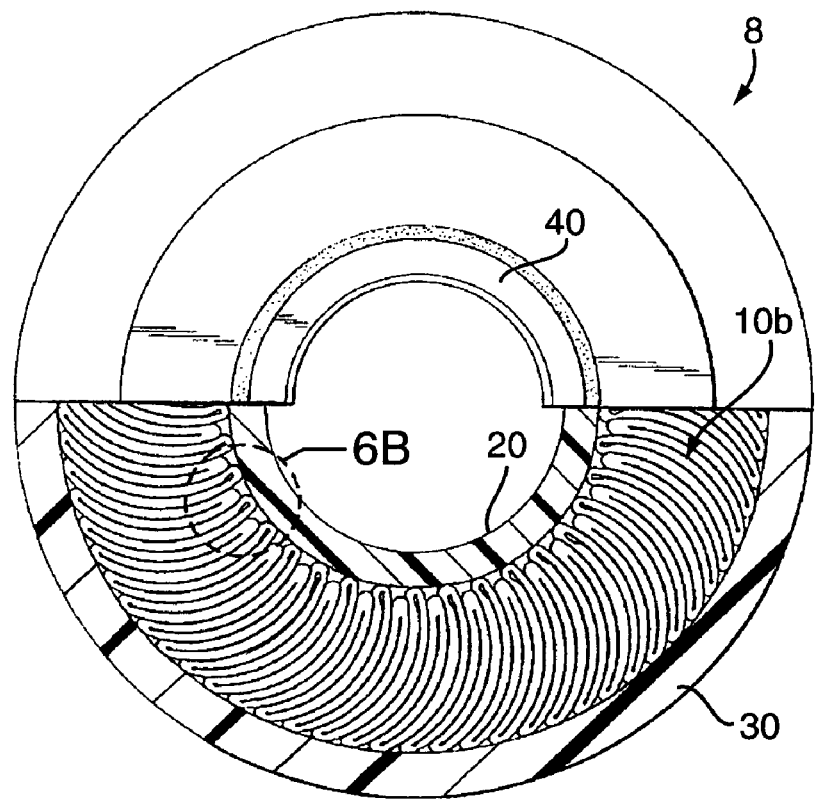
FIG. 6A is a top view, partially cut away to reveal a sectional view, of the filter module according to the embodiment of FIG. 5.
Figure 6B:
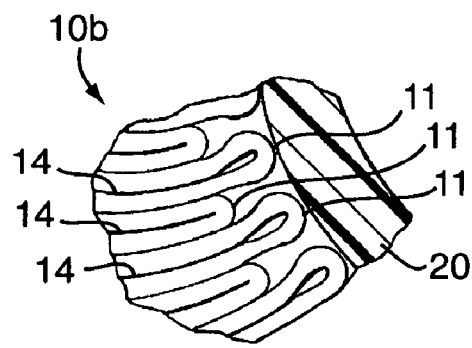
FIG. 6B is a detail of the sectional view of the filter module according to the embodiment of FIG. 5.

As best shown in FIGS. 6A and 6B, adjacent pleats of filter element 10b may have different pleat heights. The roots 11 of adjacent pleats 14, i.e. those portions of the pleats closest to core 20, may be staggered such that only every other pleat root contacts, or substantially contacts, core 20. This staggering of roots 11 of adjacent pleats 14 creates voids or channels along the periphery of filter element 10b adjacent to core 20. As a result, a plurality of longitudinally extending channels are defined between the inner periphery of filter element 10b and core 20. The crests 13 of adjacent pleats 14, i.e. those portions of the pleats closest to outer cage 30, may all substantially contact outer cage 30.

In an alternative spiral-pleat design of filter element 10b (not shown), crests 13 of pleats 14 may be staggered, creating longitudinally extending channels between the outer periphery of filter element 10b and outer cage 30. In another alternative spiral-pleat design of filter element 10b, both the roots 11 and the crests 13 of pleats 14 may be staggered, thereby creating channels along both the inner and outer peripheries of filter element 10b. These longitudinal channels enhance drainage through the cages of filter module 8. Consequently, the differential pressure drop across filter element 10b is less than the differential pressure drop across a conventional spiral-pleat filter element wherein all of the pleats have a uniform height and are tightly packed about the cartridge core.

Although filter element 10 has been described and illustrated with respect to a modified W-pleat design and a spiral-pleat design, it is apparent other pleat designs are within the scope of the present disclosure. Further, modifications and changes may be made to the disclosed pleat designs without departing from the spirit and scope of the present disclosure.

The pleated filter element 10 of the present disclosure can be manufactured by a variety of techniques. In general, however, the depth filter media and the support media, if any, to be pleated may be stored on separate rolls and simultaneously fed to a pleating machine and formed into a composite as the layers are pleated. After the composite filter element has been pleated, the filter element may be heated so that the composite layers, and in particular, the support media, thereof become heat-set.

Although not shown, the pleated, heat-set filter composite which emerges from the pleating machine is then cut to a prescribed length or prescribed number of pleats as determined by the intended dimensions of filter element 10. The length of pleated filter element is then formed into a cylindrical shape, and the lengthwise edges of the pleated filter element are sealed to each other along a seam by conventional means, such as by ultrasonic welding, to retain the pleated filter element in a cylindrical form. Cylindrical core 20 may then be axially inserted into cylindrical filter element 10, the filter element and core axially inserted into cylindrical outer cage 30, and end caps 40 attached to the ends of filter element 10 to form a complete filter module assembly 8, as shown in FIGS. 1 and 5.

As shown in FIGS. 1 and 5, cylindrical core 20 of filter module 8 supports the inner periphery of filter element 10 against forces in the radial direction and also helps to give the filter element axial strength and rigidity against bending. Core 20 may be of conventional design and may be made of any material having sufficient strength and which is compatible with the fluid being filtered. Core openings 26 are formed through core 20 to permit the passage of fluid between the outer wall and the central core of core 20. Outer cage 30 of filter module 8 may be of conventional design with outer cage openings 36 formed therein for the passage of fluid. Alternative outer cages (not shown) include an expandable mesh sleeve, a porous extruded tube, or a wrap consisting of cord, woven or non-woven material. The material of which outer cage 30 is made can be selected based on the fluid being filtered and the filtering conditions.

Usually, filter module 8 according to the present disclosure will be equipped with end caps 40 at both ends. Typically housing adaptors 41 are bonded to the end caps 40. Housing adapters 41 can be either blind or open end caps, and the material of which they are formed and their shape can be selected in accordance with the filtering conditions and the materials of the members to which the housing adapters are to be joined to the end caps. End caps 40 may be attached to filter element 10 and they may also be attached to core 20 or outer cage 30. Conventional techniques can be used to attach end caps 40 to the components of filter media, as shown in FIG. 2, for example, such as by use of an epoxy, by thermal bonding or by spin welding.

The pleated filter modules described above can be made with a wide range of parameters. Typical parameters, which are not meant to be limiting, may include a filter module having an outside diameter ranging from about 200 mm to about 325 mm, although modules having diameters upwards of about 400 mm are presently contemplated. A typical inside diameter may be about 25 mm to about 100 mm. A typical filter module height or length may range from about 100 mm to upwards of about 500 mm. The typical filter element may include from about 2 to about 7 layers of depth filter media, each layer having at least 50% by weight of an adsorber particulate material. As mentioned above, a typical adsorber particulate material is, for example, diatomaceous earth.

EXAMPLE EMBODIMENT

In accordance with one specific representative embodiment of the depth filter media, a method of forming a filter element is herein described. The individual depth filter media layers are formed by making about a 1% slurry using water that has been treated by reverse osmosis to improve its purity (RO water). A typical slurry solution consists of commercially available Kraft pulp, about 6% refined pulp (about −250 CSF, Canadian Standard Freeness, as described in U.S. Pat. No. 4,305,782) and about 68% diatomaceous earth by dry weight, as would be known by one skilled in the art. In one representative formulation two types of resin, such as, for example, the representative charge modifying recipe as disclosed in U.S. Pat. No. 5,085,784 with chemical structures as further disclosed in U.S. Pat. No. 4,473,474, the disclosure of each is herein incorporated by reference to the extent not inconsistent with the present disclosure, are added at about 5.2% and about 1.3% by weight resin solids on slurry solids respectively. Other formulations, using other charge modifying resins, could be used as would be known to those skilled in the art.

The resultant slurry was heated to about 80° C. prior to feeding the slurry into a papermaking machine (Fourdrinier type). Heating the slurry is not mandatory, but will allow for more rapid water removal, which in turn may permit increased process speed, depending on the specific slurry mixture. The slurry was laid down at a constant thickness on to a moving belt. Typical belt speeds for this process range from about 0.5 m/min to about 10 m/min. The belt was passed through a vacuum chamber to remove most of the RO water from the slurry. Typically the applied vacuum pressures ranged from about 10 to about 27 inches of Hg. This wet media was then fed under a series of infrared heaters in order to initiate drying. The media was then threaded through a series of heated rollers to finish drying the media sufficiently for further processing. The resultant depth filter media was then wound around a cardboard core. At this point in the process, the resultant depth filter media, which was believed to have less than about 5.0% moisture content by weight, is considered to be "dry" when compared to "wet" depth filter media having about 30% to about 50% moisture content by weight. In fact, any resultant depth filter media having less than about 28% moisture content by weight could be considered to be "dry" depth filter media.

Figure 7:
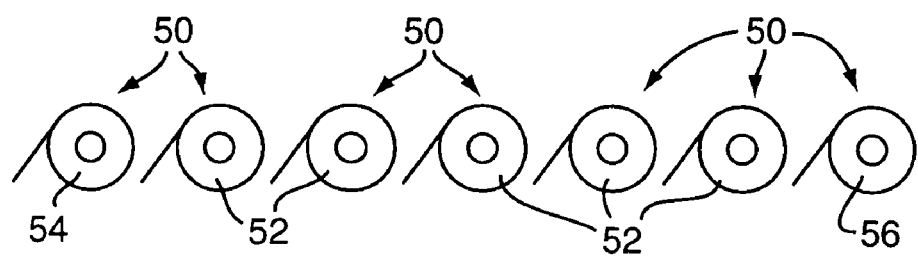
FIG. 7 is a schematic representation of an unwinding station used in accordance with embodiments of FIGS. 1 and 5.

To pleat the depth filter media and form the filter element, a plurality of depth filter media rolls 52 were operatively placed on unwind stations 50 along with rolls of upstream and downstream support materials 54, 56, respectively, as shown in FIG. 7.

The unwound depth filter media layers and support material layers were fed between a pair of rollers (not shown), such that all the layers were stacked and aligned on top of each other. A pleater capable of delivering different pleat heights, such as the Rabofsky R178PC or the Rabofsky E2000, was used to pleat the multiple layers of depth filter media and support material together. The pleating speed ranged from about 10 pleats/minute to about 35 pleats/minute.

Heating plates are normally installed in pleaters to soften the pleated filter media and support material layers and help them to take a pleat set. In conjunction with the heating the newly pleated media is restrained under pressure until it emerges from under the heater and cools, thereby allowing it to take a pleat set. This pressure is normally applied to the top of the pleats through the use of cleats pressing against the top of the pleats under pressure. This pressure also prevents springing of the filter media and support material layers during handling. In the example embodiment described herein, the top plate of the heater in the pleater was set to about 110° C. and the bottom plate was set to about 115° C. for heat setting the filter element. A back pressure of about 20.6 Kpa was applied.

The pleated composite depth filter media was crosscut using scissors after every 36 pleats. However, it is anticipated that a more suitable cutting system such as a sharp blade or water jet could be used instead. The composite media was then trimmed using a band saw on both sides to about 10 inches in width. Again, it is anticipated that a more suitable cutting system, such as a rotating blade or water jet, could be used instead to provide a flat and uniform surface for end capping.

The two free pleat edges were then seamed using conventional hot-melt glue (3M Jet Melt 3792-LM) to form a cylindrical pleated filter element. It is anticipated that a more suitable seaming system such as an injection over-mold, ultrasonic welding, or polypropylene melt etc. A core was inserted into the central region of the edge-sealed pleated filter element.

Prior to end capping, two end caps were first machined from a thick sheet of polypropylene to form end cap cavities that could hold hot melt and that could accept the core and pleated filter element. Hot melt was then dispensed into the cavity of the first end cap using an extruder, the pleated filter element with the core was pressed into this cavity, and the hotmelt was allowed to cool. This process was repeated to attach the second end cap to the other end of the filter element. In an alternative end capping procedure, the end caps were attached to the filter element and core using epoxy (LOC-TITE QUICKSET) that was dispensed from several epoxy syringe kits.

In a further alternative end capping procedure, it is anticipated that the end caps themselves may be heated using IR heaters to melt the surfaces of the end cap cavities to a suitable depth so as to fully encapsulate and seal the ends of the filter element when the filter element and core are pressed into the molten surface. After the end capping is complete, the filter modules are ready to be coupled to end adapters, if any, that may be necessary. The resultant filter cartridges are ready for assembling into various filtering arrangements.

Theoretical Study:

A theoretical study was performed to determine the relevant characterizing parameters for several example embodiments of the present disclosure. Several factors used in the theoretical study are defined below:

Displacement Volume of Filter Module—The volume occupied by a filter module.

Media Packing Density (MPD)—The mass of the depth filter media divided by the displacement volume of the filter module.

Media Utilization Index (MUI)—The mass of the depth filter media divided by the displacement volume of the filter module multiplied by the effective area of the filter module.

$G_k$ Factor ($G_k$)—The Media Utilization Index (MUI) multiplied by the thickness of the effective depth filter media of all the depth filter layers.

Dimensionless Comparison Index (DCI)—The $G_k$ factor divided by total cartridge weight, which can be stated as the following equation:

$$\frac{\text{(mass of the depth filter media)} \times \text{(effective filter area of module)} \times \text{(thickness of the effective depth filter media of all the depth filter layers)}}{\text{(the displacement volume of the filter module)} \times \text{(total cartridge weight)}}$$

Dimensionless Comparison Index 2 (DCI 2)—The same as the DCI except for using mass of particulate adsorber in place of mass of depth filter media.

Media Packing Density (MPD) is defined as the mass of the filter media divided by the displacement volume of the filter module. In the context of this definition, it is important to note that the mass refers to the effective mass i.e. mass that may be utilized during use. This term is important because it is believed that a depth filter, especially that which has particulate adsorbers, will perform better i.e. have better retention, the more charge sites it has. The charged sites are a function of how much of these particulate adsorbers one can pack without compromising flow. The volume of the filter module is the envelope size of the device to be used, and it is desirable to have the smallest possible size, as the implications would result in smaller foot prints and space taken up by the filter device when in use. Combining these two functions, effective mass and displacement volume, the MPD comparison factor has been created to identify and compare attributes of two similar purposed products. When using this comparison factor, MPD, a larger value for a particular filter device simply means that that particular filter device is a better engineered filter device than a filter device having a lower MPD value, both in performance and size.

Media Utilization Index (MUI) as defined above is the MPD multiplied by the total effective surface area of the filter module. This as can be seen is a continuation of the MPD. One down side to using MPD can be apparent in an example of a bucket full of particulate adsorbers. There is a high amount of mass and very small envelope volume; however the surface area of this device is small. Surface area is important in filtration applications because it determines flux (flow per unit area). It is believed that a lower flux will result in better filtration performance of the media because it will increase contact time with media. A lower flux results in lower fluid velocities passing through a given section of filter media within a filter device. Again like the MPD, the MUI is a comparison index for like purposed filter cartridges. A higher MUI value indicates a better engineered filter device, as a higher value indicates better performance due to the fact that there are is more mass, area, and ease of use because enhanced performance can be achieved in a smaller envelope size.

Once again just as the MUI was an improvement over the MPD, the $G_k$ factor is also an improved way to compare two like purposed filter cartridges compared to the MUI. As Mass was important in MPD for filter performance, area was important for flux in MUI, which in turn effected flux, which effects velocity of the fluid, which effects contact time. The $G_k$ factor includes one additional factor that contributes to filter performance, depth of media. The $G_k$ factor is the MUI multiplied by the total effective thickness of the media used in the filter device. Thickness of the media is imagined as a perpendicular line drawn through the media from the point of entry (surface) until the fluid penetrates out of the downstream side. Thickness or depth is important because it provides more contact time between the charge sites and the contaminant. This in turn, improves filtrate quality, i.e. a better performing filter. As with MPD and MUI, a larger $G_k$ value results in a better engineered filter device both in performance and size.

Even though, the $G_k$ factor gives a good comparison between two like purposed filter devices, there is one other factor to consider, and this is the overall weight of the filter device. One can have a device that has a high $G_k$ factor but it also may be heavier due to parts other than filtration media. This weight will skew true comparisons between two like purposed filter devices when ease of use is considered. For example a cartridge with bulkier parts will weigh more than a cartridge with lighter parts. Because of this phenomenon, and for normalizing and practical reasons, the $G_k$ factor is divided by the total filter module dry weight. This operation results in a Dimensionless Comparison Index, DCI. The highest the DCI value can be is 1 and the lowest is 0, though a 0 or 1 is physically impossible. Again the DCI encompasses filtration properties of the media, such as depth, for its contact time, area for its influence on the flux, and mass because the number of charge sites is directly related to the amount of particulate adsorber present. The DCI also encompasses physical attributes of the filter device such as size (displacement volume) and weight; these two factors contribute to the ease of use of the product. All these factors combined give a good indication of a filter device's performance and ease of use. It is also anticipated that the DCI might also use the mass of particulate adsorber in place of the mass of the media. Although the values would change accordingly, it is expected that the utility of the present disclosure would be further highlighted. With DCI 2, the differences between one pleated versions will be more apparent because U.S. Pat. No. 5,232,595 teaches particulate adsorber levels of 50% or less, where this disclosure can accommodate up to 75%.

As stated previously MPD is defined as the effective filter media mass divided by the displacement volume of the filter module. The theoretically determined MPD for the various embodiments of the present disclosure are then compared to calculated MPDs for other known prior art filter modules. The results show that the MPD for the embodiments of the present disclosure that were examined range from about 12% greater, as a minimum, to as high as about 166% greater than other known cellulosic and particulate adsorber depth-type filter cartridge systems with equal cartridge volumes. It was also shown that with the present disclosure, higher media packing densities were achieved when the filter module was designed to have a smaller volume than the other known filter module designs.

Examples and calculations comparing the various embodiments of the present disclosure with other known designs are presented below. In particular, the calculations are based on a filter element being pleated according to a modified W-pleat arrangement. As a guide the following formulas were used to calculate parameters such as module effective surface area, effective media mass, and the media packing density for filter modules according to the present disclosure:

Symbol Definitions:

| | | |
|---|---|---|
| $A_d$ = Effective area of filter disc | | $ft^2$ |
| $A_r$ = Effective surface area resulting from pleat ring number r | | $ft^2$ |
| $A_s$ = Effective surface area of module | | $ft^2$ |
| C = Number of cells | | |
| D = Number of disks | | |
| $H_p$ = Height of primary pleats | | in |
| $H_r$ = Height of pleats in ring r | | in |
| $H_s$ = Height of a specific secondary pleat | | in |

(Note that in advanced pleat design the height of each secondary pleat may differ from the height of the other secondary pleats.)

| | |
|---|---|
| ID = Inner diameter of core | in |
| $ID_p$ = Inner diameter of pleats = Outer diameter of core | in |
| $ID_r$ = Inner diameter of pleats for ring r | in |
| $ID_s$ = Inner seal outer diameter | in |
| L = Length of media | in |
| $L_p$ = Length from primary pleats | in |
| $L_r$ = Length from pleats for pleat ring r | in |
| $L_s$ = Length from secondary pleats | in |
| M = Mass of total cartridge including media and hardware | lbs |
| $M_a$ = Mass of effective media | lbs |
| N = Number of layers of filter media | |
| OD = Outer diameter of module | in |
| $OD_p$ = Outer diameter of pleats | in |
| $OD_r$ = Outer diameter of pleats for pleat ring r | in |
| $OD_s$ = Outer edge seal inner diameter | in |
| P = Number of primary pleats | |
| $P_r$ = Number of radial pleats for pleat ring r | |
| R = Total number of pleat rings | |
| S = Number of secondary pleats | |
| T = Thickness of pleats | in |

-continued

| | |
|---|---|
| V = Volume of module | $ft^3$ |
| $V_a$ = Volume of effective media | $in^3$ |
| Δd = Diameter change required to increase circumference by one pleat thickness | in |
| h = Height of module | in |
| $h_a$ = Effective height of module | in |
| t = Thickness of filter media | in |
| $t_d$ = Thickness downstream support layer | in |
| $t_u$ = Thickness of upstream support layer | in |
| MPD = Media packing density | $lbs/ft^3$ |
| $G_k$ = $G_k$ factor | lbs |
| DCI = Dimensionless Comparative Index | |
| MUI = Media Utilization Index | lbs/ft |
| ρ = Density of filter media | $lbs/in^3$ |

Assumptions:
Potting of end caps on to the pleated filter element results in a loss of ½ in at each end
The core has a wall thickness of ⅛ in
The end caps are ¼ in larger in diameter than the outer pleat diameter
Manufacturing considerations limiting the calculation of $L_s$ used secondary pleat heights $H_7$ and higher. $H_7$ is substituted in place of $H_1$ in the equation for $L_s$
Each layer of depth filter media is 0.035 inch thick
A total of 5 layers of depth filter media are used
The upstream support material has a thickness of 0.024 in
The downstream support material has a thickness of 0.010 in
Many different pleat heights are used. The height of the shortest pleat is one inch.

Formulas:

| | |
|---|---|
| $h_a$ = h − 1 (two end caps) | in |
| $ID_p$ = ID + .25 | in |
| $OD_p$ = OD − 0.25 | in |
| $H_p$ = ($OD_p$ − $ID_p$)/2 | in |
| T = 2 × (N × t + $t_d$ + $t_u$) | in |
| P = $ID_p$ × π/T | |
| $L_p$ = 2 × P × $H_p$ | in |
| S = ($OD_p$ − $ID_p$) × π/T | |
| $H_s$ = [$OD_p$ − ($ID_p$ + S × T/π)]/2 | |
| Δd = T/π | in |
| $L_s$ = 2 × S × [$H_1$ − (S − 1) × Δd/4] | in |
| L = $L_P$ + $L_s$ | in |
| $A_s$ = $h_a$ × L/144 | $ft^2$ |
| $V_a$ = L × $h_a$ × t × N | $in^3$ |
| $M_a$ = $V_a$ × ρ | lbs |
| V = $OD^2$ × π × h/(4 × 1728) | $ft^3$ |
| MPD = $M_a$/V | $lbs/ft^3$ |
| MUI = MPD × $A_s$ | lbs/ft |
| $G_k$ = MUI × (t × N/12) | lbs |
| DCI = $G_k$/M | |

Where ρ = 0.0125 $lbs/in^2$

Figure 8:
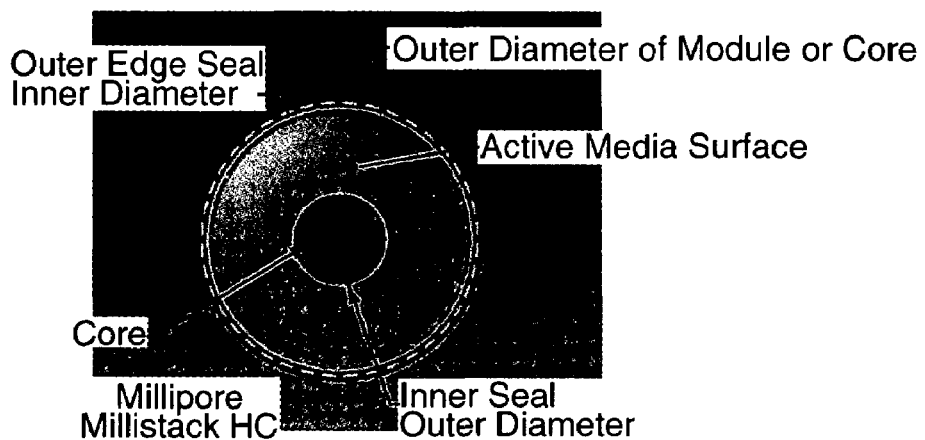
FIG. 8 is a cross-sectional top view representation of a first lenticular filter cartridge according to the prior art.

First Comparison:
In this first comparison, a first example embodiment of the present disclosure is compared with a lenticular cartridge design designated the Millipore Millistack HC (see FIG. 8). This particular lenticular cartridge design was selected for comparison because it is believed to have the highest media packing density of known prior art products.

The following data was derived from literature describing the Millipore Millistack HC:
Cartridge OD=16 in
Cartridge height=7 in
Effective surface area=19.37 sq ft
8 cell construction The following data was measured and observed from an actual product of the Millipore Millistack HC:
- Cartridge cell OD=16 in
- Outer edge seal inner diameter=15.25 in
- Diameter of Core=2 in
- Inner seal outer diameter=2.75 in
- 2 layer design, upstream layer=0.130 in thick and second layer=0.135 in thick.
- Density of combined filter media, =0.0124 lbs/in³

(This density was calculated by cutting out five 47 mm disks and weighing the samples. It was found that on average the two combined layers had a weight of about 4.0 g per 47 mm disk, which translates to about 0.0124 lbs/in³.)

- 2 sides to a cell=total of 16 two layered filter disks.
- Mass of the non-filter media components of the assembly=4.75 lbs Millipore Millistack HC Calculations:

| |
|---|
| C = 8 |
| D = 2 × C = 16 |
| $A_d = (OD_S^2 - ID_S^2) \times \pi/(4 \times 144)$    ft² |
| $A_s = A_d \times D = 19.63$    ft² |

The calculated value of As (19.63 ft²) is based on measured properties and is used instead of the literature value since the calculated value is larger.

Table I presents the calculations for this first comparison. It is shown that with the same cartridge dimensions the first example embodiment of the present disclosure has about 14% more mass packing density than the Millipore Millistack HC. It is also shown that the first example embodiment has a mass utilization index about 93% greater, a $G_k$ factor about 31% greater and a DCI about 59% greater than the Millipore Millistack HC. Further, it is shown that this first example embodiment of the present disclosure has about 14% more mass and about 69% more surface area than the Millipore Millistack HC. Greater mass results in improved retention; greater surface area either reduces flux, thereby improving throughput, or allows for faster process speeds.

Figure 9:
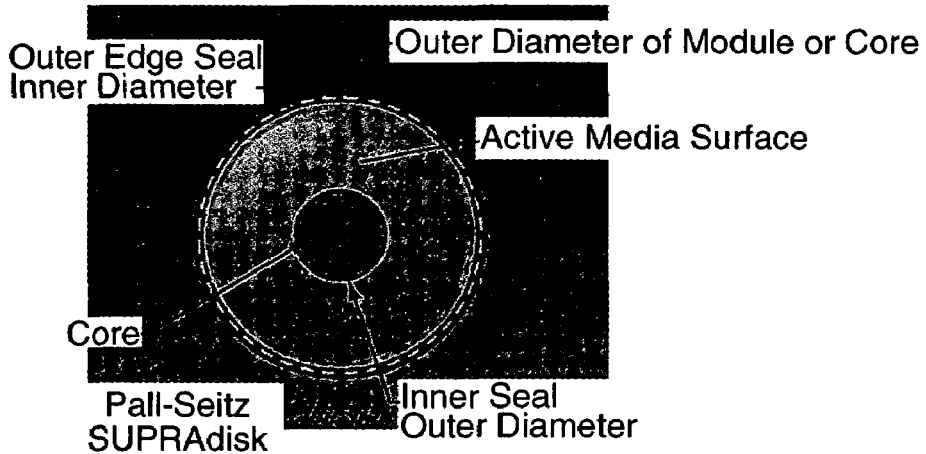
FIG. 9 is a cross-sectional top view representation of a second lenticular filter cartridge according to the prior art.
Figure 10:
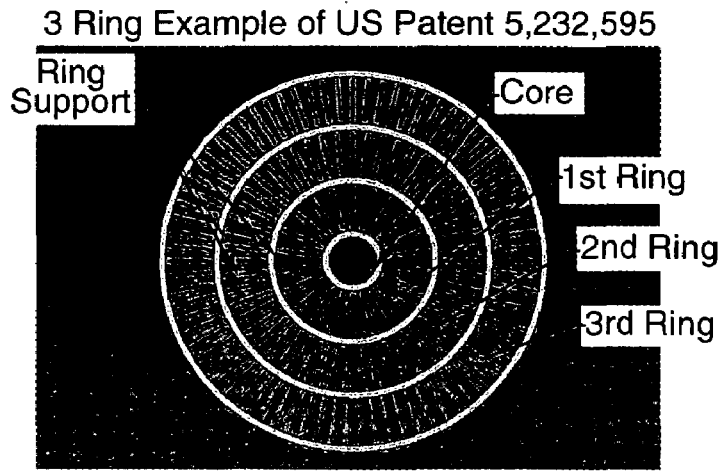
FIG. 10 is a cross-section top view representation of a filter cartridge according to the prior art.

Second Comparison:

In this second comparison, a second example embodiment of the present disclosure is compared to a lenticular cartridge designated the Pall-Seitz SUPRAdisk (see FIG. 9).

The following data was derived from literature describing the Pall-Seitz SUPRAdisk:
- Cartridge OD=11.2 in
- Cartridge height=11-13 in (11 in was used in the calculations since it yields a smaller cartridge volume.)
- Effective surface area=19.4 sq ft
- 16 cell construction The following data was measured and observed from an actual product of the Paul-Seitz SUPRAdisk:
- Cartridge cell OD=11.2 in
- Outer edge seal inner diameter=10.625 in
- ID of Core=2.5 in
- Inner seal outer diameter=2.75 in
- 1 layer design, upstream layer=0.140 in thick
- Density calculated to be 0.0136 lbs/in³
- Two filter disks per cell
- Mass of the non media components of the assembly=7.07

Calculations for Pall-Seitz SUPRAdisk

| |
|---|
| C = 8 |
| D = 2 × C = 16 |
| $A_d = (OD_S^2 - ID_S^2) \times \pi/(4 \times 144)$    ft² |
| $A_s = A_d \times D = 19.4$    ft² |

Note that the calculated value of $A_s$ (18.24 ft²) is smaller than the literature value of 19.4 ft². Therefore, the literature value was used in calculations requiring $A_s$, since it is the larger value.

Table II presents the calculations for this second comparison. It is shown that for the same cartridge dimensions, the second example embodiment of the present disclosure has about 42% more mass packing density than the Pall-Seitz SUPRAdisk. It is also shown that the second example embodiment has a mass utilization index that is about 75% greater, a $G_k$ factor that is about 111% greater and a DCI that is about 206% greater than the Pall-Seitz SUPRAdisk. Further it is shown that the second example embodiment has about 42% more mass and about 23% more surface area than the Pall-Seitz SUPRAdisk.

Third Comparison:

In this third comparison, a third example embodiment of the present disclosure is compared with a variety of designs as taught by U.S. Pat. No. 5,232,595 to Meyer. U.S. Pat. No. 5,232,595 teaches the use of a radial pleated design, where the cartridge may or may not have multiple sub rings resulting in series of shorter pleats, rather than having just one large ring.

Using the above symbols as guides the following formulas can be used to calculate various parameters of the U.S. Pat. No. 5,232,595:

| |
|---|
| $ID_1 = ID + .25$ ($ID_r$, where r = 1)    in |
| $OD_r = ID_r + 1/R \times (OD - ID_1 - R \times .25)$    in |
| $ID_r = OD_{(r-1)} + .25$ (where r > 1)    in |
| $L_r = 2 \times H_r \times P_r$    in |
| $L = \Sigma L_r$    in |
| $V_a = L \times h_a \times t \times N$    in³ |
| $M_a = V_a \times \rho$ (where $\rho = 0.0125$ lbs/in³)    lbs |

Note that the effective surface area $A_s$ for the art described in U.S. Pat. No. 5,232,595 will be defined as the effective area from the ring of pleats that is closest to the influent stream (the upstream ring). For calculation purposes it is assumed that the flow enters from the outside of the cartridge, travels through the filter and exits from the core, thus allowing for the maximum surface area possible for multi-ring designs.

Assumptions for U.S. Pat. No. 5,232,595:
- Each ring consists of a core and an outer ring. The outer ring of the inner most section is the core for the next section.
- Assume a media thickness=0.040 in. The cartridge has three layers of 0.040 in thick media per ring. This will optimize the mass packing density.
- Each ring has both an upstream and downstream support where:
  - Upstream support=0.024 in thick; and
  - Downstream support=0.010 in thick.
- Each ring support has a thickness=0.125 in.
- Each section created by the rings has the same pleat height.
- The media density=0.0125 lbs/in³.

Table III presents the calculations for this third comparison. It is shown that for the same cartridge dimensions, this third example embodiment has at least 6% more mass packing density than the art taught in U.S. Pat. No. 5,232,595. It is also shown that this third example embodiment has a mass utilization index at least 38% greater, a $G_k$ factor at least 100% greater, and a DCI at least 104% greater than the art taught in U.S. Pat. No. 5,232,595. Another observation is that this third example embodiment has at least 6% more mass and at least 14%, more surface area than what is taught by U.S. Pat. No. 5,232,595.

As is evident from a review of Tables I and II where the pleated filter element of the present disclosure having the advanced pleat technology is compared to two of the lenticular style cartridges, the advantages of the pleated filter element of the present disclosure become more apparent. In Table I the pleated filter element of the present disclosure is compared to the best known lenticular cartridge design believed presently available. As evident, the first embodiment representing the pleated filter element of the present disclosure is clearly a better engineered device than the lenticular cartridge of the prior art when built to the same physical dimensions, as the DCI is about 0.54 whereas the DCI for the lenticular cartridge is about 0.34. Consequently, the DCI of about 0.34 is the highest known DCI for a lenticular cartridge believed attainable, thus far. It is believed that the pleated filter element of the present disclosure, can achieve a DCI value of up to about 0.64. It is further believed that the pleated filter element of the present disclosure is best utilized when the DCI thereof is between about 0.35 to about 0.64. The DCI is a comparative index that normalizes the cartridges to be compared based on their total cartridge dry weight, and the physical volume each cartridge occupies in space. These two factors contribute to the ease of use and space saving considerations, because to get a larger DCI value, one needs to have either or both smaller volume and lighter components. Other factors included in the DCI are the total effective media mass, total effective surface area, and the total effective thickness of the media. Again, to achieve a higher DCI value, a cartridge has to have high amounts of media, surface area and total depth. Media mass is one indication that the cartridge will perform better than any alternative considered because it is believed that, with a higher mass, there is a higher concentration of adsorptive particulates. These adsorptive particulates contribute to the adsorptive function of the depth media by providing more charge sites. In addition to the media mass the DCI also considers area. The more surface area a filter has the better the filter performance that can be expected. With a larger surface area, assuming process flow rates remain constant, the flux is reduced. Flux, as expressed as flow rate per unit area, is influential in determining the contact time the fluid has with the charge sites. Obviously, a lower flux means longer contact times, thus, enabling the depth media to be more efficient. Another influential factor concerning contact time is media depth or thickness. The DCI also considers thickness. The thicker the depth media is the more contact time the fluid to be filtered has with the charged sites in the media. This longer contact time will enable a more efficient filtration. In Table I, it is again clear that the other comparative indexes are also higher for the pleated filter element of the present disclosure when compared to the particular evaluated lenticular design. As can be seen, the $G_k$ factor is about 6.28, the MUI is about 427, the MPD is about 12.87 for the describe representative embodiment of the pleated filter element of the present disclosure, where as the lenticular cartridge yields a $G_k$ factor of about 4.78, an MUI of about 220, an MPD of about 11.25, and a MPD of about 11.25. All of these comparison factors and indexes indicate that the pleated filter element of the present disclosure is a better over all design compared to the lenticular cartridge of Table I. The greater indexes values recorded for the pleated filter element of the present disclosure suggests that the pleated filter element of the present disclosure will be more efficient since it has a greater surface area and a greater effective media mass. For this comparison purposes the volume of the cartridge was kept the same, however, it is important to note that because of the simplicity of the design, (having less parts), the total dry weight of the cartridge can be reduced, thus giving a higher DCI value. Again the DCI can be expressed in terms of DCI 2 where the effective mass of the media is replaced by mass of total particulate adsorbers. This change would not lead to the same conditions for this comparison since it is believed that both cartridges will not have the same percent mass of particulate adsorbers. The DCI 2 will be more evident in other design comparisons especially in Table III.

As with Table I, Table II compares a second embodiment of the pleated filter element of the present disclosure to another lenticular style cartridge. In Table II, the second embodiment of the pleated filter element of the present disclosure, which has about the same total volume as the lenticular cartridge it, is being compared to clearly surpass this same lenticular cartridge. In Table II, one can see that the second embodiment of the of the pleated filter element of the present disclosure has a DCI of about 0.49, a $G_k$ value of about 4.19, a MUI of about 287.5, and an MPD of about 12, which is considerably greater than the lenticular style cartridge in Table II where the DCI is about 0.16, the $G_k$ factor is about 1.98, the MUI is about 164.2, the MPD is about 8.47.

In Table III the of the pleated filter element of the present disclosure is compared to variations of the embodiments in U.S. Pat. No. 5,232,595. U.S. Pat. No. 5,232,595 discloses a radially pleated device where, there may or may not be sub-rings, where the pleated element contains at most 50% by dry weight particulate adsorbers. In Table III an up to five subring version of the embodiment in the U.S. Pat. No. 5,232,595 is shown. These 5 versions are compared to a third representative embodiment the pleated filter element of the present disclosure. The third embodiment of the pleated filter element of the present disclosure has a DCI value of about 0.49, a $G_k$ value of about 3.51, an MUI of about 240.45, and an MPD of about 11.72, where as the best case of the embodiment in U.S. Pat. No. 5,232,595, which happens to have two sub rings, has a DCI value of about 0.24, a $G_k$ value of about 1.74, an MUI of about 174.24 and an MPD value of about 11.09. In this case and in the other versions of the embodiments in U.S. Pat. No. 5,232,595, the third representative embodiment of the pleated filter element of the present disclosure built to the same dimensions, has higher comparative values, which is believed to give the pleated filter element of the present disclosure both greater performance and ease of use characteristics. As mentioned previously, it is believed that a DCI 2 value may also be used where the mass of the filter media is replaced by the total mass of the particulate adsorber in the filter media. It is possible to make a filter media containing up to about 75% particulate adsorbers with the pleated filter element of the present disclosure. However, U.S. Pat. No. 5,232,595 only teaches up to 50% particulate adsorber in their depth filter media. Bearing this in mind, an embodiment constructed accordingly would yield even greater differences in DCI 2 values between the pleated filter element of the present disclosure and an embodiment made according to U.S. Pat. No. 5,232,595.

It should be once again noted that the pleated filter element of the present disclosure can pack more media mass, more particulate adsorbers, more area, than lenticular style depth filter cartridges and more mass, more particulate adsorbers and more area than other pleated depth filter media devices in the same size, spacial volume of the filter device or cartridge. It should also be noted that, depending on the applications, the pleated filter element of the present disclosure has the capability to increase its total media thickness by increasing the number of layers. These characteristics that are possessed by the pleated filter element of the present disclosure provide for a robust and more efficient depth filtration device in a given size compared to other presently known technologies. Furthermore, the same efficiency and performance can be achieved in relatively smaller sizes of the pleated filter element of the present disclosure when compared to lenticular and other depth filter cartridge counterparts because the pleated filter element of the present disclosure takes advantage of the high packing properties of the advanced pleat technology, thus, providing a depth filter cartridge that is easier to use, both in weight for the operators to handle, size for ease of grasping, and even cost because it would, at the least, would incur lower shipping costs because of its smaller size and weight resulting from the presence of less non filter media components than its lenticular counterparts. Additionally, the lenticular cartridges trap moisture and the fluid contributing to greater wet weights which also makes the lenticular cartridges more difficult to handle after use. It is believed the pleated filter element of present disclosure will eliminate most of the above by eliminating most of the void volume. Overall, it is believed that the pleated filter element of present disclosure represents an innovative way to make a depth filter with potentially greater performance incorporated into a filter device that is easier to handle when compared to the devices in the Tables.

Example 1

In a specific example of media forming the individual depth filter media layer were formed by making about a 1% slurry using water that has been treated by reverse osmosis to improve its purity (RO water). The slurry solution consisted of about 26.8% commercially available Kraft pulp, about 7.3% refined pulp (about −250 CSF, Canadian Standard Freeness, as described in U.S. Pat. No. 4,305,782) and about 65.9% 0.02 D'Arcy's diatomaceous earth (World Minerals Celite 507) by dry weight, as would be known by one skilled in the art. A Polyamine-Epichlorohydrin Resin (Hercules Polycap 1884) was added at about 1.5% by weight resin solids on slurry solids.

The resultant slurry was fed into a papermaking machine (Fourdrinier type). The slurry was laid down at a constant thickness on to a moving screen. The screen speed for this process was about 3 ft/min. The screen was over vacuum slots to remove most of the RO water from the slurry. The applied vacuum pressures ranged from about 18 to about 20 inches of Hg. This wet media was then fed under a series of infrared heaters to initiate drying. The media was then threaded through a series of heated rollers to achieve complete drying of the media for further processing. The resultant depth filter media was then wound around a cardboard core. At this point, the media thickness was measured to be between about 0.019 and about 0.021 inches.

To pleat the depth filter media and form the filter element, the depth filter media rolls were operatively placed on unwind stations along with rolls of upstream and downstream support materials where the rolls were placed such that, the upstream support layer was BBA Fibemet Nonwovens TYPAR 3091L, the upstream media layer, the following layer of media, and the downstream media layer was of the specific example media, and finally the downstream support material was a Delstar 5 mil Delnet RC0707-24PP.

The unwound depth filter media layers and support material layers were fed between a pair of rollers, such that all the layers were stacked and aligned on top of each other. A pleater capable of delivering different pleat heights, the Rabofsky R178PC, was used to pleat the multiple layers of depth filter media and support material together. The pleating speed ranged from about 10 pleats/minute to about 35 pleats/minute.

In this specific example embodiment described herein, the top plate of the heater in the pleater was set to about 100° C. and the bottom plate was set to about 100° C. for heat setting the filter element. A back pressure of about 1.7 bar was applied.

A previously determined set of primary and secondary pleat heights were entered into the recipe of the pleater and the following nominal primary and secondary pleats were made:

| Primary and Secondary Pleat Heights, Where 0.62 represents Primary Pleats, Nominal heights (in) | Number of repetitions in the pleat pattern |
|---|---|
| 0.62 | 2 |
| 0.42 | 2 |
| 0.32 | 1 |
| 0.62 | 2 |
| 0.51 | 1 |
| 0.49 | 2 |
| 0.62 | 2 |
| 0.42 | 2 |
| 0.51 | 1 |
| 0.62 | 1 |

The above program was allowed to repeat for about 3 cycles. The pleated composite depth filter media was crosscut using scissors after about every 48 to about 50 pleats. The composite media was then trimmed using two circular rotating blades on each side to about 9.29 inches in width. The two free pleat edges and in between each consecutive media and support layer were then seamed using conventional hot-melt glue (3M Jet Melt 3792-LM) to form a cylindrical pleated filter element. A core was inserted into the central region of the edge-sealed pleated filter element.

The end caps themselves were heated using IR heaters to melt the surfaces of the end cap cavities to a suitable depth approximately 0.050 inches so as to fully encapsulate and seal the ends of the filter element when the filter element and core are pressed into the molten surface. After the end capping was complete, the filter modules are ready to be coupled to end adapters, where a double o-ring piston style adapter using 226 o-rings was bonded to the end cap on one side and a blind cap on to the other side. Two of these cartridges were made each having an accessible surface area of about 3.25 sqft.

The resultant filter cartridges were then placed in a stainless steel CUNO filter housing model number 1ZMS1 and sealed. The cartridges were challenges with a molasses solution. Grandma's Molasses—"Robust Flavor" (Green Label) was dispersed in water at a concentration of approximately 0.16 grams per liter. The flow rate chosen was about 3 gallons per minute per cartridge element resulting in a flux of 37.5 liters per minute per square meter. The pressure drop across the filter was monitored and the test was stopped once the pressure drop reached 25 psid. This first cartridge reached this pressure drop after processing 915 Liters per square. The second cartridge, challenged in the same ways as the first cartridge, reached this pressure drop after processing 972 Liters per square.

Example 2

The unpleated flat stock, as described in the specific example (Example 1) media, was cut into a 47 mm disk using a dye from each of the rolls used previously to make the filter cartridge composed of the filter module and the pleated filter element. The filter disks were then placed in to a Cuno 47 mm housing Part number 70225-01 where the media were placed in the same order as in the way the rolls were used to create the filter element as described previously and the housing was sealed. This process was repeated for 1 additional housing resulting in 2 housings assembled in the same manner. Using a flow of 45.4 ml/min resulting on a flux of 37.5 liters per minute per square meter, the filters were challenged with 0.16 g/L Grandma's Molasses—"Robust Flavor" (Green Label) brand molasses dispersed in water. The pressure drop across the filter was monitored and the test was stopped when a pressure differential of 25 PSID was recorded across the filters. The resulting throughput for the 2 housings was, 888, and 925, liters per square meter respectively.

Example 3

Using the pleated media used to make the cartridges tested previously, 47 mm disks were cut from the pleated material. The pleated media was first stretched so that it would lay flat, then using a dye 47 mm disks were cut all at once of the 3 layers making up the pleat pack. The upstream and downstream support material were removed and the combination of the media was placed into the 47 mm housing as before, and challenged in the same manner as the flat stock testing as described in the above example 2. The resultant throughput was measured to be 937 liters per minute per square meter.

Finally, the resultant throughput of the previous 3 examples was compared. As shown in Table IV, the results show that pleating the media does not affect the filtration performance. Furthermore when this pleated media is built into a cartridge, all the pleated surface area is accessed. As the results clearly show, no loss of performance was experienced by the conversion of flat stock filtration media to pleated filtration media.

The present disclosure allows adsorptive depth media having high amounts of adsorber particulate matter to maintain its structural integrity when pleated dry, with out having to wet the media prior to pleating. The innovation of using multiple layers of thinner depth filter media results in lower strains at the internal and external bend radii of each layer compared to the neutral bending radius. This pleating without cracking is achieved even if the percent of particulate matter is above 50%. Thus, the depth filter media may be pleated without structural damage that prevents its utilization in filtration operations. Furthermore, by combining multiple layers of thin depth filter media, the filter element achieves the same overall thickness as one the prior art's monolithic layer. The multi-layered depth filter media does not crack when pleated, because the individual layers are free to slip relative to one another, thus avoiding the problems of cracking and separation or delamination. A filter module formed of multiple depth filter media layers having high percentages of adsorber particulate matter and a high area pleat design is now achievable. This filter module has been determined to be superior to conventional filter modules because the resulting adsorptive depth filter media has substantially higher media packing density and surface area than was previously achievable resulting in higher efficiency and better flow rates for a given cartridge volume.

Although the present disclosure has been described and illustrated with respect to example embodiments, it is apparent that modifications and changes can be made thereto without departing from the spirit and scope of the presently disclosed embodiments, including but not limited to, the pleated filter module, pleated composite depth filter medium and the various methods associated therewith as defined in the following claims.

What is claimed is:

1. A pleated filter module comprising;
   a composite depth filter medium formed into a plurality of pleats, the composite depth filter medium including a plurality of depth filter media layers, each of the plurality of depth filter media layers including greater than 60% by weight adsorber particulate matter, wherein each layer of the composite depth filter medium has a thickness that is less than or equal to about 1300 microns; and
   end caps, operatively connected to the composite depth filter medium, for sealing the ends thereof;
      wherein the adsorber particulate matter is one of activated carbon, diatomaceous earth, perlite, or combinations thereof.

2. The pleated filter module of claim 1 wherein the DCI of the pleated filter module is greater than or equal to about 0.40.

3. The pleated filter module of claim 1 further comprising; at most two additional layers of filtration media without any adsorber particulate matter.

4. The pleated filter module of claim 1 wherein the DCI 2 of the pleated filter module is greater than or equal to about 0.36.

5. The pleated filter module of claim 1 wherein the MPD of the pleated filter module is greater than or equal to about 11.5.

6. The pleated filter module of claim 1 wherein the pleated filter module further comprises: an upstream support layer; and a downstream support layer adjacent to the composite depth filter medium.

7. The pleated filter module of claim 1 wherein the plurality of depth filter media layers comprises: from at least 3 to at most 20 layers.

8. A pleated filter module comprising;
   a composite depth filter media formed into a plurality of pleats; the composite depth filter media including a plurality of depth filter media layers, each of the plurality of depth filter media layers including greater than 60% by weight adsorber particulate matter wherein each layer of the plurality of depth filter media layers has a thickness that is less than or equal to about 1300 microns and wherein the plurality of pleats include outwardly radiating primary pleats and inwardly radiating secondary pleats, the secondary pleats being interspersed among the primary pleats, each primary pleat having a radial height, each secondary pleat having a radial height that is less than the radial height of each primary pleat; and
   end caps, operatively connected to the composite depth filter medium, for sealing the ends thereof;
      wherein the adsorber particulate matter is one of activated carbon, diatomaceous earth, perlite, or combinations thereof.

9. The pleated filter module of claim 8 wherein the DCI of the pleated filter module is greater than or equal to about 0.40.

10. The pleated filter module of claim 8 further comprising; at most two additional layers of filtration media without any adsorber particulate matter.

11. The pleated filter module of claim 8 wherein the DCI 2 of the filter module is greater than or equal to about 0.36.

12. The pleated filter module of claim 8 wherein the MPD of the module is greater than or equal to about 11.5.

13. The pleated filter module of claim 8 wherein the pleated filter module further comprises; an upstream support layer; and a downstream support layer adjacent the composite depth filter medium.

14. The pleated filter module of claim 8 wherein the plurality of depth filter media layers comprises: from at least 3 to at most 20 layers.

15. The filter module of claim 8 wherein the configuration of the plurality of pleats is selected from the group comprising; a configuration having one secondary pleat positioned between two adjacent pairs of primary pleats, a configuration having two secondary pleats positioned between two adjacent pairs of primary pleats and a configuration having one secondary pleat positioned between two adjacent primary pleats.

16. A method of making a composite depth filter medium comprising:
providing a first depth filter media layer including greater than 60% by weight adsorber particulate matter and having a thickness less than about 1300 microns;
providing a second depth filter media layer including adsorber particulate matter and having a thickness less than about 1300 microns;
stacking the second depth filter media layer on the first depth filter media layer; and
pleating the stacked first and second depth filter media layers;
wherein the adsorber particulate matter is one of activated carbon, diatomaceous earth, perlite, or combinations thereof.

17. The method of claim 16, further comprising:
providing a third and a fourth depth filter media layer, each layer having at least 50% by weight of adsorber particulate matter.

18. A pleated composite depth filter medium comprising:
a plurality of depth filter media layers, each of the plurality of depth filter media layers having a thickness less than about 1300 microns and including adsorber particulate matter; wherein at least one of the plurality of depth filter media layers includes greater than 60% by weight of adsorber particulate matter;
wherein the adsorber particulate matter is one of activated carbon, diatomaceous earth, perlite, or combinations thereof.

19. The pleated filter module of claim 1 wherein the composite depth filter medium has a total thickness ranging from about 2500 microns to about 7500 microns.

20. The pleated filter module of claim 1 wherein each layer of the composite depth filter medium has a thickness that is less than or equal to about 900 microns.

21. The pleated filter module of claim 19 wherein each layer of the composite depth filter medium has a thickness that is less than or equal to about 900 microns.

22. The pleated filter module of claim 8 wherein the composite depth filter medium has a total thickness ranging from about 2500 microns to about 7500 microns.

23. The pleated filter module of claim 22 wherein each layer of the composite depth filter medium has a thickness that is less than or equal to about 900 microns.

24. The pleated filter module of claim 8 wherein each layer of the composite depth filter medium has a thickness that is less than or equal to about 900 microns.

25. The method of claim 16 wherein the composite depth filter medium has a total thickness ranging from about 2500 microns to about 7500 microns.

26. The method of claim 25 wherein at least one of the first or second depth filter media layers of the composite depth filter medium has a thickness that is less than or equal to about 900 microns.

27. The method of claim 16 wherein at least one of the first or second depth filter media layers of the composite depth filter medium has a thickness that is less than or equal to about 900 microns.

28. The pleated filter module of claim 18 wherein the composite depth filter medium has a total thickness ranging from about 2500 microns to about 7500 microns.

29. The pleated filter module of claim 28 wherein each layer of the composite depth filter medium has a thickness that is less than or equal to about 900 microns.

30. The pleated filter module of claim 18 wherein each layer of the composite depth filter medium has a thickness that is less than or equal to about 900 microns.

31. The pleated filter module of claim 1 wherein the adsorber particulate matter is one of diatomaceous earth, perlite, or combinations thereof.

32. The pleated filter module of claim 8 wherein the adsorber particulate matter is one of diatomaceous earth, perlite, or combinations thereof.

33. The pleated filter module of claim 16 wherein the adsorber particulate matter is one of diatomaceous earth, perlite, or combinations thereof.

34. The pleated filter module of claim 18 wherein the adsorber particulate matter is one of diatomaceous earth, perlite, or combinations thereof.

* * * * *